United States Patent [19]

Brown

[11] Patent Number: 5,620,112
[45] Date of Patent: Apr. 15, 1997

[54] NOVELTY EXERCISE BEVERAGE VESSEL

[76] Inventor: Gary I. Brown, 3425 W. Maule Ave., Las Vegas, Nev. 89118

[21] Appl. No.: 609,353

[22] Filed: Mar. 1, 1996

[51] Int. Cl.⁶ .................................................. B65D 17/44
[52] U.S. Cl. ................... 220/703; 220/DIG. 13; 220/603; D9/441; D9/451; 482/108
[58] Field of Search ........................... 220/703, DIG. 13, 220/603; 272/122; 215/239; D9/441, 451

[56] References Cited

U.S. PATENT DOCUMENTS

| | | | |
|---|---|---|---|
| 497,940 | 5/1893 | Bacon, Jr. | 220/703 |
| 677,489 | 7/1901 | Woods | 220/DIG. 13 |
| 2,199,310 | 4/1940 | Hartley | 220/DIG. 13 |
| 4,055,273 | 10/1977 | Jones | 220/703 |
| 4,561,560 | 12/1985 | Lyon | 220/703 |
| 4,703,927 | 11/1987 | Hanzlik | 272/122 |
| 4,712,794 | 12/1987 | Hall | 272/122 |
| 4,720,098 | 1/1988 | Gordon | 272/122 |
| 5,379,909 | 1/1995 | Roark | 215/239 |
| 5,518,143 | 5/1996 | Iodicg | 220/703 |

*Primary Examiner*—Joseph M. Moy
*Attorney, Agent, or Firm*—Joseph N. Breaux

[57] ABSTRACT

An exercise beverage vessel comprising a central, cylindrically shaped, hollow grip portion; a first, second, third and fourth cylindrical shaped, hollow disk member integrally formed with the grip portion to form a barbell shaped drinking vessel; a weight housing in connection with the third disk member having a weight chamber formed therein that is accessible through a fill aperture and having at least one transparent viewing portion of a size sufficient to allow a viewer to view a weight increasing agent level within the weight chamber; a plug member sized to frictionally fit within the fill aperture; and a hinged cap member, hingedly attached to the fourth disk member with a hinge mechanism, having a pivoting cover portion of a size sufficient to cover a drinking opening formed in the fourth disk member.

18 Claims, 2 Drawing Sheets

5,620,112

NOVELTY EXERCISE BEVERAGE VESSEL

TECHNICAL FIELD

The present invention relates to exercise equipment having a beverage container integrally formed therein and more particularly to a hand held exercise weight having a beverage vessel formed therein that is sealable with a lid.

BACKGROUND ART

It is a common joke among television viewing sports enthusiasts that they achieve a large degree of exercise from repetitively lifting canned beverages during television viewing sessions. It would be a benefit to this joke to have a drinking vessel that had the outward appearance of an exercise device such as a dumbbell. It would be a further benefit, if the drinking vessel were sealable to allow for the user to go through a range of exercise motions as an exhibit of his/her athletic prowess without undue spillage of the beverage. It would also be desirable to have a mechanism for allowing the user to add additional weight to the drinking vessel to increase the exercise effect.

GENERAL SUMMARY DISCUSSION OF INVENTION

It is thus an object of the invention to provide a drinking vessel that has the outward appearance of an exercise device such as a dumbbell.

It is a further object of the invention to provide a drinking vessel having the outward appearance of a dumbbell that includes a beverage compartment that is sufficiently sealable to allow the user to go through a range of exercise motions as an exhibit of his/her athletic prowess.

It is a still further object of the invention to provide a drinking vessel having the outward appearance of a dumbbell that includes a sealable weight chamber formed within the vessel suitable for containing either a liquid or a pelletized weight increasing agent.

It is a still further object of the invention to provide a drinking vessel having the outward appearance of a dumbbell that includes a sealable weight chamber formed within the vessel suitable for containing either a liquid or a pelletized weight increasing agent that has a viewing window for allowing a user to determine the level of weight increasing agent within the weight chamber.

It is a still further object of the invention to provide an exercise beverage vessel that accomplishes all or some of the above objects in combination.

Accordingly, an exercise beverage vessel is provided. The exercise beverage vessel comprises a central, cylindrically shaped, hollow grip portion having a grip portion beverage chamber formed therein, and having a grip portion outer diameter of between two and two and three-quarters inches, and a length between first and second ends thereof of between four and six inches; a first cylindrical shaped, hollow disk member integrally formed with the first end of the grip portion having a first outer diameter of between four and five inches and a first beverage chamber formed therein that is in fluid communication with the grip portion beverage chamber; a second cylindrical shaped, hollow disk member integrally formed with the second end of the grip portion having a second outer diameter equal to the first outer diameter and having a second beverage chamber formed therein that is in fluid communication with the grip portion beverage chamber; a third cylindrically shaped, hollow disk member integrally formed with the second disk member having a third outer diameter of between six and one-half and seven and one-half inches and a third beverage chamber formed therein that is in fluid communication with the second beverage chamber; a fourth cylindrical shaped, hollow disk member integrally formed with the first disk member having a fourth outer diameter equal to the third outer diameter and having a fourth beverage chamber formed therein that is in fluid communication with the first beverage chamber and with the exterior of the exercise beverage vessel, the fluid communication with the exterior of the exercise beverage vessel being through a drinking opening; a weight housing in connection with the third disk member having a weight chamber formed therein that is accessible through a fill aperture formed through an outer wall of the weight housing, the fill aperture being of a size sufficient to allow introduction therethrough and into the weight chamber of a weight increasing agent, the weight housing further having at least one transparent viewing portion of a size sufficient to allow a viewer to view the weight agent level within the weight chamber; a plug member sized to frictionally fit within the fill aperture in a manner to provide a fluid tight seal; and a hinged cap member, hingedly attached to the fourth disk member with a hinge mechanism, having a pivoting cover portion of a size sufficient to cover the drinking opening, the cover portion including a resilient seal disposed along a perimeter edge thereof that contacts an outer surface of the fourth disk member adjacent to and surrounding the drinking opening when the cover portion is pivoted into a first position. The weight housing preferably has weight indicating indicia positioned in relation to the viewing window for indicating an approximate weight according to the level of at least one weight increasing agent within the weight chamber, and more preferably has first and second sets of indicia: the first set for a liquid weight increasing agent such as water, the second set for a pellet type weight increasing agent such as cooper BB's or lead shot. The cap member preferably has a thumb tab in connection with the cover portion in a manner such that movement of the thumb tab in a direction toward the grip portion causes the cover portion to move away from the drinking opening.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2A is a cross-sectional detail view of the exercise drinking vessel of FIG. 1 showing the weight housing and the second and third disk members.

EXEMPLARY MODE FOR CARRYING OUT THE INVENTION

Figure 1:
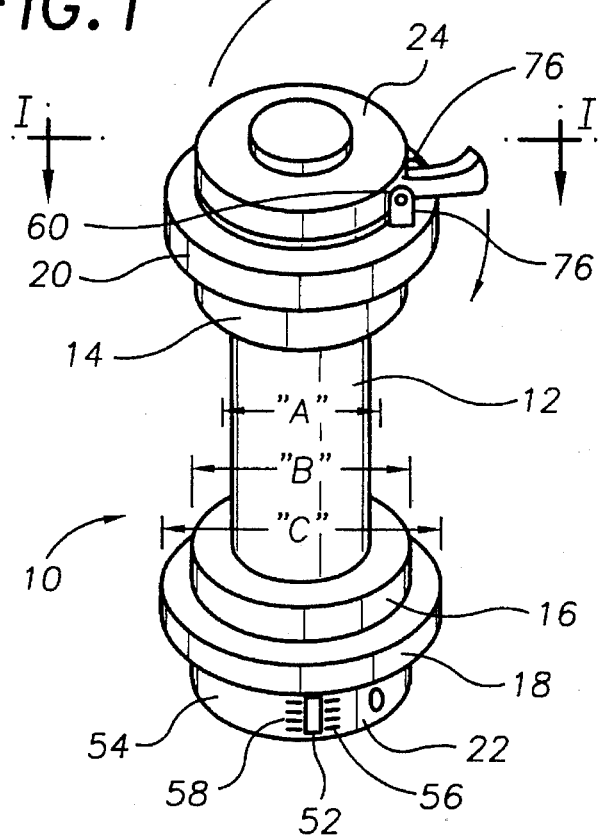
FIG. 1 is a perspective view of an exemplary embodiment of the exercise beverage vessel of the present invention showing the cover portion of the cap member pivoted down into the first position covering the drinking opening, the viewing window provided through the weight housing, and two sets of weight indicating indicia positioned adjacent to the viewing window.

FIG. 1 shows an exemplary embodiment of the exercise beverage vessel of the present invention generally designated by the numeral 10. Beverage vessel 10 includes a grip portion 12, a first cylindrical disk member 14, a second cylindrical disk member 16, a third cylindrical disk member 18, a fourth cylindrical disk member 20, a weight housing 22, and a cap member 24. Grip portion 12, first cylindrical disk member 14, second cylindrical disk member 16, third cylindrical disk member 18, fourth cylindrical disk member 20, and weight housing 22 are integrally formed from polyethylene plastic.

Grip portion 12 is centrally disposed between first cylindrical disk member 14, second cylindrical disk member 16, third cylindrical disk member 18, and fourth cylindrical disk member 20. Grip portion 12 is cylindrically shaped and has a grip portion beverage chamber 26 (FIG. 2) formed therein. Grip portion 12 has an outer diameter "A" of two and one-half (2 ½") inches, and a length of four and seven-eighths (4 ⅞") inches.

Figure 2:
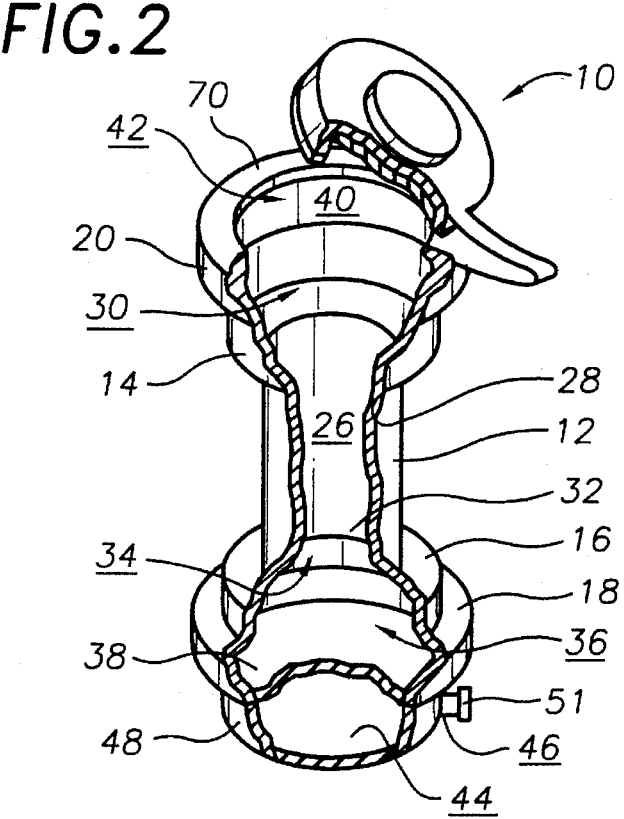
FIG. 2 is a perspective partial cut away view of the exercise beverage vessel of FIG. 1 showing the cover portion of the cap member pivoted away from the drinking opening, the resilient seal disposed along the edge of the cover portion, the first, second third fourth and grip portion beverage chambers, and the weight chamber.

With reference to FIG. 2, first cylindrical shaped, hollow disk member 14 is integrally formed with a first end 28 of grip portion 12 and has an outer diameter "B" (FIG. 1) of four and three-quarters (4 ¾") inches. A first beverage chamber 30 is formed therein that is in fluid communication with grip portion beverage chamber 26. The term "fluid communication" is used herein to mean that fluids are readily transmitted from one chamber to the other.

Second cylindrical shaped, hollow disk member 16 is integrally formed with a second end 32 of grip portion 12 and has a second outer diameter equal to first outer diameter "B" (FIG. 1). A second beverage chamber 34 is formed therein that is in fluid communication with grip portion beverage chamber 26.

Third cylindrically shaped, hollow disk member 18 is integrally formed with second disk member 16 and has a third outer diameter "C" (FIG. 1) of seven (7") inches. A third beverage chamber 36 is formed within third cylindrically shaped disk member 18 that is in fluid communication with second beverage chamber 34. A dividing wall 38 is provided to seal one end of third cylindrically shaped disk member 18.

Fourth cylindrical shaped, hollow disk member 20 is integrally formed with first disk member 14 and has a fourth outer diameter equal to third outer diameter "C" (FIG. 1). A fourth beverage chamber 40 is formed therein that is in fluid communication with first beverage chamber 30 and with the exterior of exercise beverage vessel 10. The fluid communication with the exterior of exercise beverage vessel 10 is through a drinking opening 42.

Weight housing 22 is integrally formed with third disk member 18. With reference to FIG. 2A, a weight chamber 44 is formed within weight housing 22. Weight chamber 44 is filled through a circular fill aperture 46 formed through an outer wall 48 of weight housing 22. Fill aperture 46 is about one-quarter (¼") in diameter and is sealable with a plastic plug 51 that is sized friction fit within fill aperture 46 in a manner to provide a liquid tight seal for fill aperture 46. Fill aperture 46 is sized to allow a quantity of copper BB's 50 to be introduction therethrough and into weight chamber 22.

Although copper BB's 50 are used in this embodiment, a liquid such as water may also be used as the weight increasing agent.

With reference once again to FIG. 1, weight housing 22 includes a transparent viewing window 52 along an entire side wall 54 of weight housing 22. A first set of raised weight indicating protrusions 56 are located along one side of viewing window 52 to indicate the approximate weight of BB's within weight chamber 44. A second set of raised weight indicating protrusions 58 are positioned on another side of viewing window 52 to indicate the approximate weight of water contained within weight chamber 44. Use of two sets of weight indicating protrusions allows the user to change the weight increasing agent without having to loose the weight approximation feature.

Figure 3:
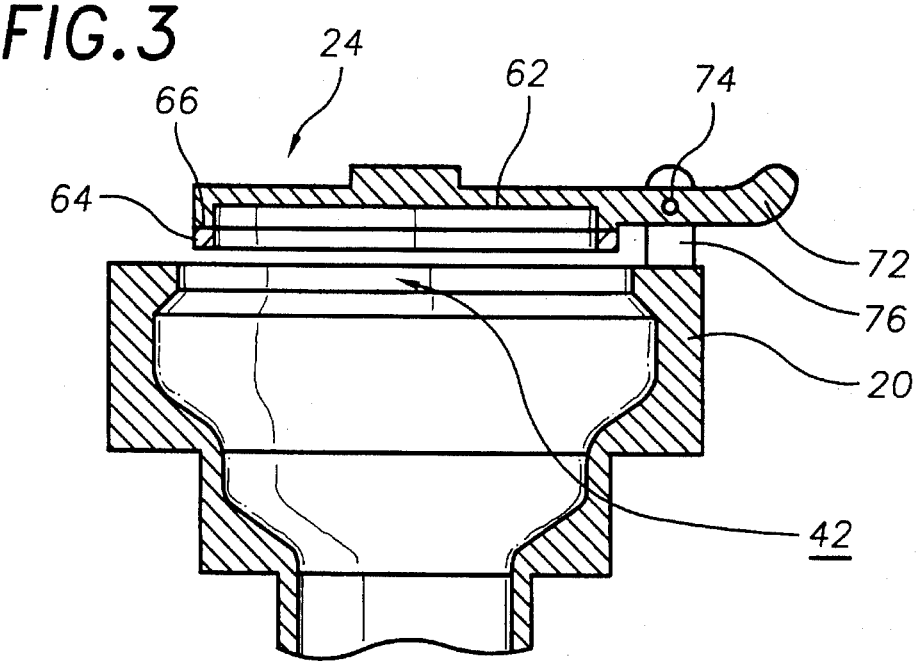
FIG. 3 is a cross-sectional detail view of the exercise drinking vessel of FIG. 1 showing the cap mechanism and the first and fourth disk members.
Figure 4:
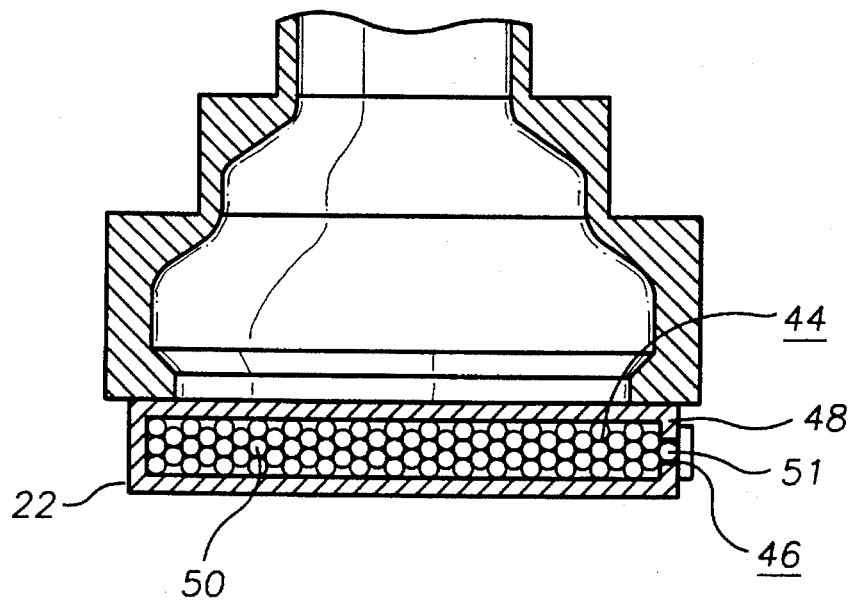

Hinged cap member 24 is hingedly attached to the fourth disk member with a hinge mechanism 60. With reference to FIG. 3, hinged cap member 24 includes a pivoting cover portion 62 of a size sufficient to cover drinking opening 42. Cover portion 62 includes a resilient seal 64 disposed along a perimeter edge 66. In use, resilient seal 64 contacts an outer surface 70 (FIG. 2) of fourth disk member 20 that is adjacent to and surrounds drinking opening 42. A thumb tab 72 is connected to cover portion 62 and has a pivot pin 74 that passes therethrough and into a pair of spaced, raised hinge stanchions 76 (only one shown in the figure). Hinge stanchions 76 are spaced a distance of about one-sixty-fourth (1/64") of an inch less than the width of thumb tab 72. This allows hinge stanchions to frictionally grip thumb tab 72 and hold it in a fixed position when thumb tab 72 is not subject to a force. In addition, the gripping force between hinge stanchions 76 and thumb tab 72 has sufficient gripping force to hold cover portion 62 in the first position covering drinking opening 42, as shown in FIG. 1, with resilient seal 64 contacting outer surface 70.

Use of exercise beverage vessel 10 is now described with general reference to FIGS. 1–3. The weight of exercise beverage vessel 10 is adjusted by removing plastic plug 51 and adding or removing copper BB's 50. Plug 51 is then inserted into fill aperture 46 and the weight determined against first set of raised weight indicating protrusions 56. If more or less weight is desired, the weight is adjusted by adding or removing a quantity of copper BB's 50. Once the desired additional weight is achieved, a beverage may be poured into the combined beverage chambers 26,30,34,36, and 40. To help keep the beverage cool, cover portion 62 can be pivoted down into the first position. In addition, with cover portion 62 in the first position, exercise drinking vessel 10 can be manipulated up and down without spilling the beverage.

It can be seen from the preceding description that a drinking vessel that has the outward appearance of an exercise device such as a dumbbell has been provided, that includes a beverage compartment that is sufficiently sealable to allow the user to go through a range of exercise motions as an exhibit of his/her athletic prowess; that includes a sealable weight chamber formed within the vessel suitable for containing either a liquid or a pelletized weight increasing agent; and that has a viewing window for allowing a user to determine the level of weight increasing agent within the weight chamber.

It is noted that the embodiment of the exercise beverage vessel described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A exercise beverage vessel comprising:

a central, cylindrically shaped, hollow grip portion having a grip portion beverage chamber formed therein, and having a grip portion outer diameter of between two and two and three-quarters inches, and a length between first and second ends thereof of between four and six inches;

a first cylindrical shaped, hollow disk member integrally formed with said first end of said grip portion having a first outer diameter of between four and five inches and a first beverage chamber formed therein that is in fluid communication with said grip portion beverage chamber;

a second cylindrical shaped, hollow disk member integrally formed with said second end of said grip portion having a second outer diameter equal to said first outer diameter and having a second beverage chamber formed therein that is in fluid communication with said grip portion beverage chamber;

a third cylindrically shaped, hollow disk member integrally formed with said second disk member having a third outer diameter of between six and one-half and seven and one half inches and a third beverage chamber formed therein that is in fluid communication with said second beverage chamber;

a fourth cylindrical shaped, hollow disk member integrally formed with said first disk member having a fourth outer diameter equal to said third outer diameter and having a fourth beverage chamber formed therein that is in fluid communication with said first beverage chamber and with said exterior of said exercise beverage vessel, said fluid communication with said exterior of said exercise beverage vessel being through a drinking opening;

a weight housing in connection with said third disk member having a weight chamber formed therein that is accessible through a fill aperture formed through an outer wall of said weight housing, said fill aperture being of a size sufficient to allow introduction therethrough and into said weight chamber of a weight increasing agent, said weight housing further having at least one transparent viewing portion of a size sufficient to allow a viewer to view said weight agent level within said weight chamber;

a plug member sized to frictionally fit within said fill aperture in a manner to provide a fluid tight seal;

a hinged cap member, hingedly attached to said fourth disk member with a hinge mechanism, having a pivoting cover portion of a size sufficient to cover said drinking opening, said cover portion including a resilient seal disposed along a perimeter edge thereof that contacts an outer surface of said fourth disk member adjacent to and surrounding said drinking opening when said cover portion is pivoted into a first position.

2. The exercise beverage vessel of claim 1, wherein:

said weight housing has weight indicating indicia positioned in relation to said viewing window for indicating an approximate weight according to said level of at least one weight increasing agent within said weight chamber.

3. The exercise beverage vessel of claim 2, wherein:

said weight housing has first and second sets of weight indicating indicia, said first set of weight indicating indicia indicating weight for a liquid weight increasing agent, said second set of weight indicating indicia indicating weight for a weight increasing agent in pellet form.

4. The exercise beverage vessel of claim 1 wherein:

said cap member has a thumb tab in connection with said cover portion in a manner such that movement of said thumb tab in a direction toward said grip portion causes said cover portion to move away from said drinking opening.

5. The exercise beverage vessel of claim 1 wherein:

said hinge mechanism includes a thumb tab in connection with said cover portion, a pivot pin that passes through said thumb tab, and a pair of spaced, said hinge stanchions being spaced a distance less than the width of thumb tab in a manner such that said hinged stanchions frictionally grip said thumb tab when said thumb tab is positioned therebetween.

6. The exercise beverage vessel of claim 5 wherein:

said hinge stanchions have sufficient gripping force to hold said cover portion said first position covering said drinking opening.

7. The exercise beverage vessel of claim 2 wherein:

said cap member has a thumb tab in connection with said cover portion in a manner such that movement of said thumb tab in a direction toward said grip portion causes said cover portion to move away from said drinking opening.

8. The exercise beverage vessel of claim 2 wherein:

said hinge mechanism includes a thumb tab in connection with said cover portion, a pivot pin that passes through said thumb tab, and a pair of spaced, said hinge stanchions being spaced a distance less than the width of thumb tab in a manner such that said hinged stanchions frictionally grip said thumb tab when said thumb tab is positioned therebetween.

9. The exercise beverage vessel of claim 8 wherein:

said hinge stanchions have sufficient gripping force to hold said cover portion said first position covering said drinking opening.

10. The exercise beverage vessel of claim 7 wherein:

said hinge mechanism includes a thumb tab in connection with said cover portion, a pivot pin that passes through said thumb tab, and a pair of spaced, said hinge stanchions being spaced a distance less than the width of thumb tab in a manner such that said hinged stanchions frictionally grip said thumb tab when said thumb tab is positioned therebetween.

11. The exercise beverage vessel of claim 10 wherein:

said hinge stanchions have sufficient gripping force to hold said cover portion said first position covering said drinking opening.

12. The exercise beverage vessel of claim 3 wherein:

said cap member has a thumb tab in connection with said cover portion in a manner such that movement of said thumb tab in a direction toward said grip portion causes said cover portion to move away from said drinking opening.

13. The exercise beverage vessel of claim 3 wherein:

said hinge mechanism includes a thumb tab in connection with said cover portion, a pivot pin that passes through said thumb tab, and a pair of spaced, said hinge stanchions being spaced a distance less than the width of thumb tab in a manner such that said hinged stanchions frictionally grip said thumb tab when said thumb tab is positioned therebetween.

14. The exercise beverage vessel of claim 13 wherein:

said hinge stanchions have sufficient gripping force to hold said cover portion said first position covering said drinking opening.

15. The exercise beverage vessel of claim 12 wherein:

said hinge mechanism includes a thumb tab in connection with said cover portion, a pivot pin that passes through said thumb tab, and a pair of spaced, said hinge stanchions being spaced distance less than the width of thumb tab in a manner such that said hinged stanchions frictionally grip said thumb tab when said thumb tab is positioned therebetween.

16. The exercise beverage vessel of claim 15 wherein:

said hinge stanchions have sufficient gripping force to hold said cover portion said first position covering said drinking opening.

17. The exercise beverage vessel of claim 4 wherein:

said hinge mechanism includes a thumb tab in connection with said cover portion, a pivot pin that passes through said thumb tab, and a pair of spaced, said hinge stanchions being spaced distance less than the width of thumb tab in a manner such that sa id hinged stanchions frictionally grip said thumb tab when said thumb tab is positioned therebetween.

18. The exercise beverage vessel of claim 17 where in:

said hinge stanchions have sufficient gripping force to hold said cover portion said first position covering said drinking opening.

\* \* \* \* \*